(12) United States Patent
Kashibuchi

(10) Patent No.: US 11,676,267 B2
(45) Date of Patent: Jun. 13, 2023

(54) INFORMATION PROCESSING APPARATUS, PRINTING SYSTEM, CONTROL METHOD OF PRINTING SYSTEM, AND STORAGE MEDIUM

(71) Applicant: CANON KABUSHIKI KAISHA, Tokyo (JP)

(72) Inventor: Yoichi Kashibuchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/737,307

(22) Filed: May 5, 2022

(65) Prior Publication Data

US 2022/0366555 A1 Nov. 17, 2022

(30) Foreign Application Priority Data

May 11, 2021 (JP) .............................. JP2021-080158

(51) Int. Cl.
*G06T 7/00* (2017.01)
*G06K 15/02* (2006.01)
(52) U.S. Cl.
CPC .......... *G06T 7/001* (2013.01); *G06K 15/1878* (2013.01); *G06T 2207/10024* (2013.01); *G06T 2207/30144* (2013.01)

(58) Field of Classification Search
CPC ........... G06T 7/001; G06T 2207/10024; G06T 2207/30144; G06K 15/1878
See application file for complete search history.

(56) References Cited

U.S. PATENT DOCUMENTS

| 8,639,128 | B2 | 1/2014 | Kawamoto et al. |
| 11,151,705 | B2 * | 10/2021 | Ikeda .................... G06T 7/0002 |
| 2010/0123914 | A1 * | 5/2010 | Uwatoko ............. H04N 1/4072 |
| | | | 358/1.9 |

FOREIGN PATENT DOCUMENTS

JP 2012032776 A 2/2012

* cited by examiner

*Primary Examiner* — Quang N Vo
(74) *Attorney, Agent, or Firm* — Rossi, Kimms & McDowell LLP

(57) ABSTRACT

An object is to perform both quality maintenance of a printed material and suppression of a reduction in productivity of a printing apparatus by performing density correction processing at appropriate timing that takes into consideration the state of the printing apparatus. The above-described object is implemented by accumulating inspection results of printed sheets that are output from the printing apparatus and causing the printing apparatus to perform density correction processing in a case where a color defect in which a destination color is not reproduced occurs successively a predetermined number of times or more at positions at which the color defect does not overlap another defect.

14 Claims, 11 Drawing Sheets

| No. | Density Fluctuation Determination |
|---|---|
| 1 | Present |
| 2 | Present |
| 3 | Absent |
| 4 | Absent |
| ⋮ | ⋮ |
| 20 | Absent |

Most recent difference value : Present

FIG.9A

| No. | Density Fluctuation Determination |
|---|---|
| 1 | Present |
| 2 | Present |
| 3 | Present |
| 4 | Absent |
| ⋮ | ⋮ |
| 20 | Absent |

Most recent difference value : Present

FIG.9B

INFORMATION PROCESSING APPARATUS, PRINTING SYSTEM, CONTROL METHOD OF PRINTING SYSTEM, AND STORAGE MEDIUM

BACKGROUND

Field

The present disclosure relates to a control technique of density correction in a printing apparatus.

Description of the Related Art

There is a case where a so-called print defect, such as stain and color loss, occurs in a printed material that is output from a printing apparatus. The print defect such as this reduces the quality of a printed material, and therefore, it is required to inspect the presence/absence of a print defect. Then, the visual inspection in which an inspector visually inspects the presence/absence of a print defect requires much time and cost, and therefore, a technique to automatically perform inspection without relying on visual inspection has been proposed. On the other hand, for the printing apparatus, it is necessary to appropriately perform density correction processing for maintaining color reproducibility, but during the density correction processing, the print job needs to be suspended, and therefore, there is a demand to reduce the frequency of execution thereof as low as possible. In this regard, there is an in-line printing system capable of print processing while automatically performing inspection, in which an inspection apparatus and a printing apparatus are connected and the inspection apparatus instructs the printing apparatus to perform density correction processing. For example, Japanese Patent Laid-Open No. 2012-032776 has disclosed a method of controlling the kind of density correction processing and execution timing based on an inspection threshold value (severity of inspection reference) of a print defect in the inspection apparatus.

With the technique of Japanese Patent Laid-Open No. 2012-032776 described above, in a case where a severe inspection reference is set, the density correction processing that causes downtime (that is, reduces productivity) is performed periodically irrespective of the state of the printing apparatus. That is, in a case of the technique of Japanese Patent Laid-Open No. 2012-032776, there is a possibility that the density correction processing that is originally not necessary in terms of the state of the printing apparatus is performed, and therefore, the techniques is not sufficient from the standpoint of improvement of productivity.

SUMMARY

The information processing apparatus according to the present disclosure is an information processing apparatus that inspects a printed material and includes: one or more controllers including one or more processors and one or more memories, the one or more controllers being configured to: obtain a read image obtained by reading a printed sheet that is output from a printing apparatus and a reference image that is used as a reference in an inspection for the read image; detect a print defect based on a difference between the obtained read image and the reference image; and give instructions to perform density correction processing to the printing apparatus based on results of the detection for a plurality of the printed sheets, wherein in a case where a color defect in which a destination color is not reproduced among detected print defects occurs successively at positions at which the color defect does not overlap another defect other than the color defect, the printing apparatus is given the instructions to perform the density correction processing.

Further features of the present disclosure will become apparent from the following description of exemplary embodiments with reference to the attached drawings.

BRIEF DESCRIPTION OF THE DRAWINGS

FIG. 9A and FIG. 9B are diagrams explaining the way a table as history information is updated;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the figurations shown schematically.

First Embodiment

<Configuration of Printing System>

Figure 1:
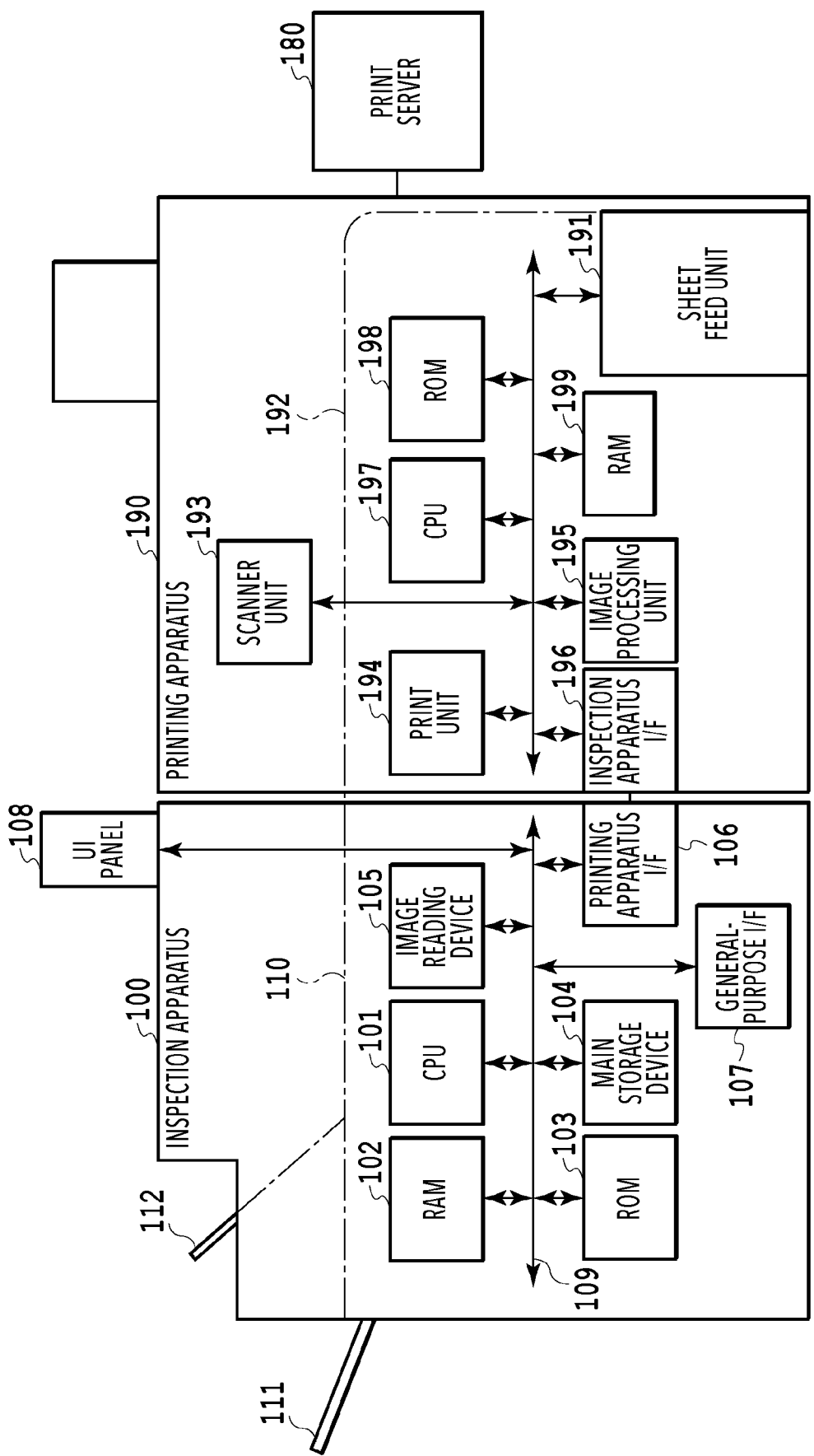
FIG. 1 is a diagram showing a configuration example of an entire printing system.

First, with reference to FIG. 1, a configuration example of an entire printing system according to the present embodiment is explained. The printing system according to the present embodiment has an inspection apparatus 100, a print server 180, and a printing apparatus 190. The print server 180 has a function to generate a print job for causing the printing apparatus 190 to perform print processing and input the print job to the printing apparatus 190. The print server 180 has also a function to receive a request to generate a print job, printing-target document data and the like from an external device, not shown schematically, which is connected so as to be capable of communication via a network.

<<Outline of Printing Apparatus>>

The printing apparatus 190 has a printing function to form an image on a printing medium such as paper (in the following, called "sheet") based on a print job that is input from the print server 180. As the printing method that the printing apparatus 190 performs, there is an offset method, an electrophotographic method, an ink jet method, or the like. In the present embodiment, explanation is given by taking the electrophotographic method as an example, but the example is not limited to this. The printing apparatus 190 internally has a CPU 197, a RAM 198, a ROM 199, a sheet feed unit 191, a scanner unit 193, a print unit 194, an image processing unit 195, and an inspection apparatus I/F (interface) 196. A user sets a sheet in the sheet feed unit 191 in advance. In a case where a print job is input, the printing apparatus 190 generates print image data for which image processing for printing, to be described later, has been performed by the image processing unit 195. After that, the printing apparatus 190 forms, while conveying the sheet that is set in the sheet feed unit 191 along a conveyance path 192, an image on the obverse side or both sides of the sheet in the print unit 194 and conveys the sheet to the inspection apparatus 100. The CPU 197 is a processor that controls the entire inside of the printing apparatus 190. The RAM 199 functions as a main memory, a work area and the like of the CPU 197. The ROM 198 stores program groups that are executed by the CPU 197. Further, the printing apparatus 190 performs density correction processing for keeping the color reproducibility of the print unit 194 at a predetermined level by instructions from a UI panel (not shown schematically) of the printing apparatus 190, or instructions from the inspection apparatus 100, to be described later. By this density correction processing, a correction LUT, to be described later, which is used in gamma correction processing of the image processing unit 195, is updated.

<Outline of Inspection Apparatus>

The inspection apparatus 100 is an information processing apparatus that inspects the presence/absence of a print defect of a printed material that is output from the printing apparatus 190. In the present specification, the series of processing for inspecting the presence/absence of a print defect is referred to as "inspection processing" and processing to detect a print defect corresponding to one or a plurality of inspection items, which is included in the inspection processing, is referred to as "defect detection processing (or simply, detection processing)". The inspection apparatus 100 internally comprises a CPU 101, a RAM 102, a ROM 103, a main storage device 104, and an image reading device 105. Further, the inspection apparatus 100 comprises a printing apparatus I/F (interface) 106, a general-purpose I/F (interface) 107, a UI (user interface) panel 108, and a main bus 109. Furthermore, the inspection apparatus 100 comprises a conveyance path 110 for conveying a sheet (printed sheet) for which print processing has been performed in the printing apparatus 190, a sheet discharge tray 111 for the printed sheet having passed the inspection and a sheet discharge tray 112 for the printed sheet having failed the inspection. The classification of the inspection results do not need to be into two kinds of pass and failure and it may also be possible to classify the inspection results into more detailed kinds.

The CPU 101 is a processor that controls the entire inside of the inspection apparatus 100. The RAM 102 functions as a main memory, a work area and the like of the CPU 101. The ROM 103 stores program groups that are executed by the CPU 101. The main storage device 104 stores applications that are executed by the CPU 101, data that is used in image processing, and the like. It is possible for the image reading device (scanner) 105 to read one side or both sides of a printed sheet on the conveyance path, which is output from the printing apparatus 190, and obtain the results as read image data. Specifically, the image reading device 105 reads one side or both sides of a printed sheet that is conveyed by using one or more reading sensors provided in the vicinity of the conveyance path 110. The reading sensor may be provided only on one side or may be provided on both sides, that is, the obverse side and the reverse side of a printed sheet for reading both sides at the same time. In a case where the reading sensor is provided only on one side, it may also be possible to cause the reading sensor to read, after causing the reading sensor to read one side, the other side again by reversing the obverse side and the reverse side of a printed sheet by using a both-side conveyance path, not shown schematically, in the conveyance path 110.

The printing apparatus I/F 106 is connected with the printing apparatus 190 via the inspection apparatus I/F 196 and synchronizes the processing timing of the printed sheet with the printing apparatus 190, informs the operation situation thereof, and so on. Instructions to perform density correction processing for the printing apparatus 190, to be described later, are given also via this printing apparatus I/F 106. The general-purpose I/F 107 is a serial bus interface, such as USB and IEEE 1394, and through which it is possible for a user to take out data of a log and the like, input some data to the inspection apparatus 100, and so on. The UI panel 108 is, for example, a liquid crystal display (display unit) and functions as a user interface of the inspection apparatus 100 and displays a screen for displaying the current situation and for various settings. Further, by means of the touch panel function, it is possible to detect a user operation for a button on the displayed screen and receive instructions from a user.

The main bus 109 connects each unit of the inspection apparatus 100 to one another. By instructions from the CPU 101 through the main bus 109, it is possible to cause each unit within the inspection apparatus 100 to operate. For example, the conveyance path 110 is moved in synchronization with the conveyance path 192 of the printing apparatus 190, switching is performed between sending a printed sheet to the sheet discharge tray 111 for passed inspection and sending a printed sheet to the sheet discharge tray 112 for failed inspection, and so on. Further, it may also be possible for the inspection apparatus 100 to comprise a GPU specialized in image processing, in addition to the CPU 101.

The inspection apparatus 100 according to the present embodiment reads a printed sheet that is conveyed from the printing apparatus 190 by the image reading device 105 and based on the obtained read image data, performs inspection processing, to be explained below. In a case where no print defect is detected from a printed sheet in the results of the inspection processing, the printed sheet is conveyed up to the sheet discharge tray 111 for passed inspection and in a case where some print defect is detected, the printed sheet is conveyed to the sheet discharge tray 112 for failed inspection. Further, based on the results of the inspection processing, the inspection apparatus 100 instructs the printing apparatus 190 to perform the density correction processing. In this manner, the inspection apparatus 100 controls the execution timing of the density correction processing so that the color reproducibility is kept in the printing apparatus 190 while collecting only the printed sheets whose quality has been accepted on the sheet discharge tray 111 as the products for delivery.

<Function Configuration of Inspection Apparatus>

Figure 2:
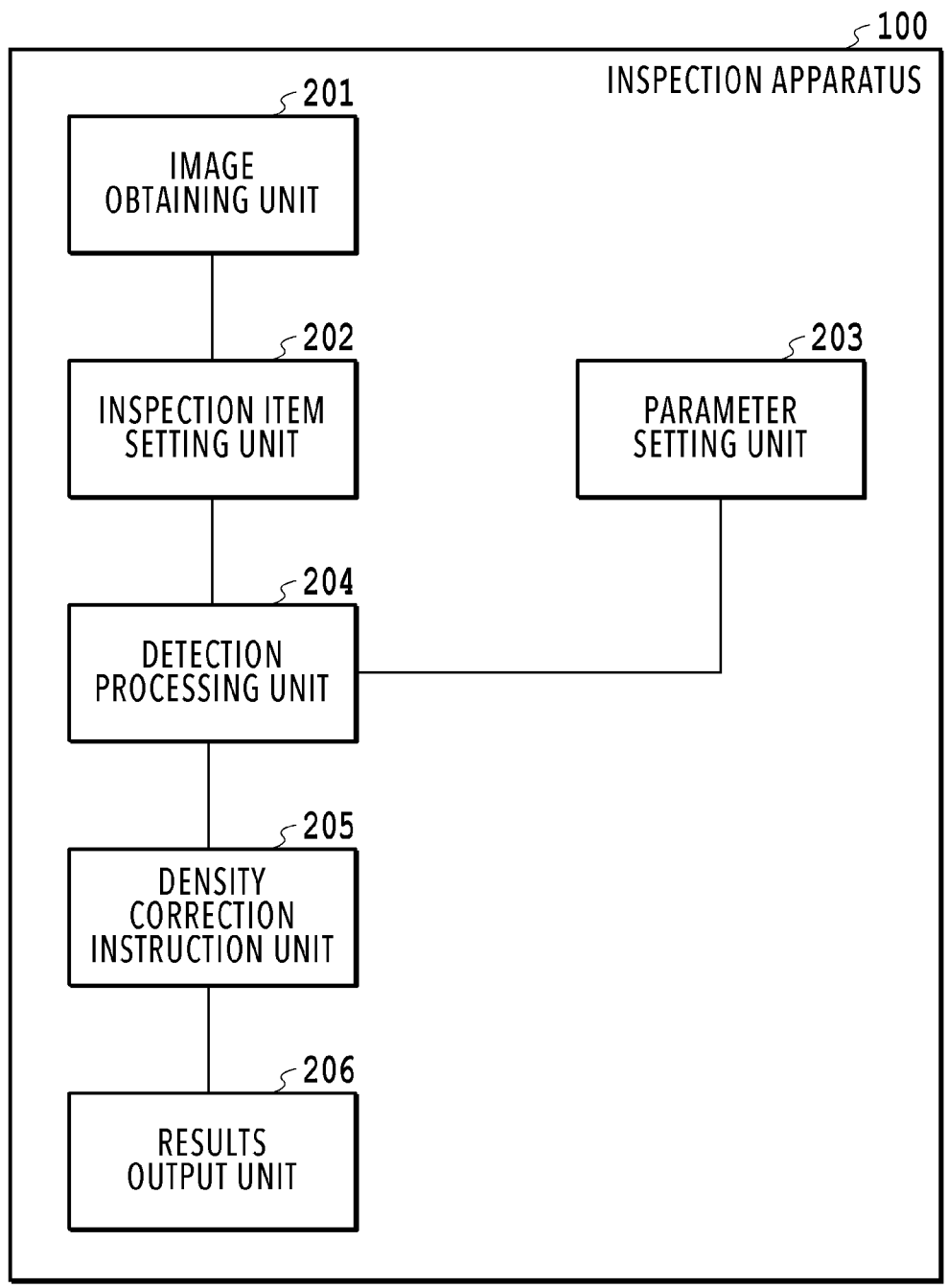
FIG. 2 is a block diagram showing various functions of an inspection apparatus.

Next, the functions mainly relating to the inspection processing of the inspection apparatus 100 according to the present embodiment are explained. FIG. 2 is a block diagram showing various functions for implementing the inspection processing. As shown in FIG. 2, the inspection apparatus 100 has an image obtaining unit 201, an inspection item setting unit 202, a parameter setting unit 203, a detection processing unit 204, a density correction instruction unit 205, and a results output unit 206.

The image obtaining unit 201 obtains an image pair of an inspection-target read image (in the following, called "inspection image") obtained by reading a printed sheet and a reference image corresponding thereto, both stored in the RAM 102 or the main storage device 104. Here, the reference image is an image that is used as a reference for comparison with the inspection image. For example, it is possible to obtain the reference image by reading a printed sheet (sample sheet) determined by a user to be printed normally by the image reading apparatus 105. The reference image is stored in advance in the RAM 102 or the main storage device 104 of the inspection apparatus 100 before starting the inspection processing. For example, it may also be possible for the image obtaining unit 201 to obtain the reference image stored in the print server 180 or the printing apparatus 190. In a case of obtaining the reference image from an external device of the inspection apparatus 100, it is sufficient for the image obtaining unit 201 to transmit an obtaining request to the external device and obtain the reference image as its response.

The inspection item setting unit 202 and the parameter setting unit 203 set an inspection item, which is the inspection target in inspection processing, and a processing parameter corresponding to each inspection item based on the user selection and the like via the UI panel 108. The detection processing unit 204 performs defect detection processing in accordance with the inspection item that is set by the inspection item setting unit 202 by using the processing parameter that is set by the parameter setting unit 203. The results output unit 206 outputs results of the defect detection processing by the detection processing unit 204 to the UI panel 108 and/or an external device, not shown schematically, as inspection results. The density correction instruction unit 205 creates history information on the inspection results and determines whether a density fluctuation occurs successively from the history information. Then, in a case where it is estimated that a density fluctuation occurs successively, the density correction instruction unit 205 instructs the printing apparatus 190 to perform density correction processing.

<Image Processing for Printing>

Figure 3:
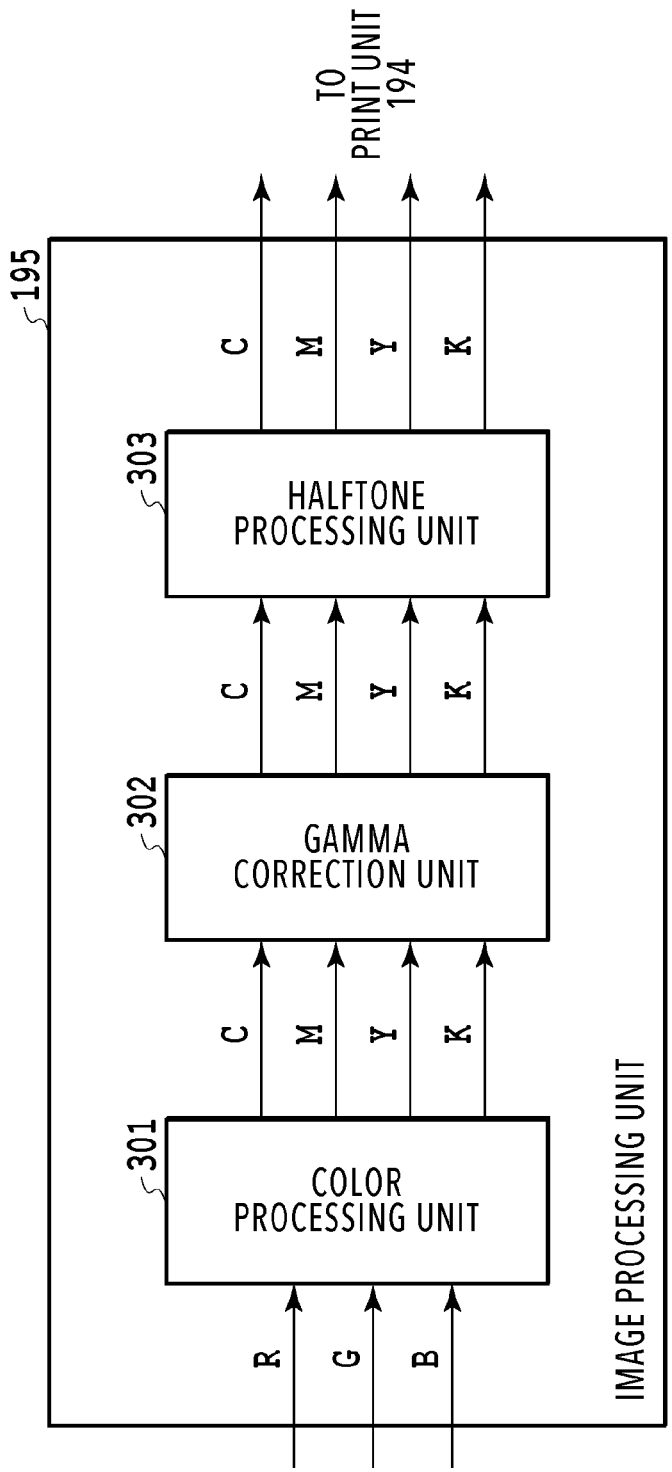
FIG. 3 is a block diagram showing an internal configuration of an image processing unit.

Next, by using FIG. 3, image processing for printing, which is performed in the printing apparatus 190, is explained. FIG. 3 is a block diagram showing the internal configuration of the image processing unit 195 of the printing apparatus 190. The image processing unit 195 has a color processing unit 301, a gamma correction unit 302, and a halftone processing unit 303. Then, each of these units is implemented by, for example, the CPU 197 reading and executing programs stored in the ROM 198.

In a case where a print job is input from the print server 180, first, the CPU 197 analyzes PDL data included in the print job and generates image data in the bitmap format and delivers the image data to the image processing unit 195. The image data in the bitmap format is an image (in the following, described as "RGB image") in which the color value of each pixel is represented in, for example, an 8-bit RGB color space. Consequently, in the image processing unit 195, first, color conversion processing is performed by the color processing unit 301, which converts the RGB image into an image (in the following, described as "CMYK image") represented by four colors of CMYK corresponding to color materials of toner. Due to this, the image in which each pixel has a color value in the RGB color space is converted into the image in which each pixel has a color value in the CMYK color space. Next, by the gamma correction unit 302, gamma correction processing is performed for each color of CMYK. The gamma correction processing is processing to correct the density value of each color plane of the CYMK image by using a correction LUT that associates the input density value and the output density value so as to achieve an appropriate tone representation in accordance with the gamma characteristic of the print unit 194. The correction LUT is prepared in advance and the gamma correction unit 302 performs gamma correction by reading the correction LUT from the RAM 199. Then, lastly, in the halftone processing unit 303, halftone processing is performed for each color of CMYK for the CMYK image for which gamma correction has been performed. Due to this, the CMYK image is converted into halftone-dot image data that the print unit 194 can process. The halftone-dot image data for each color plane, which is obtained as described above, is sent to the print unit 194 and printed and output.

<Inspection Processing>

Figure 4:
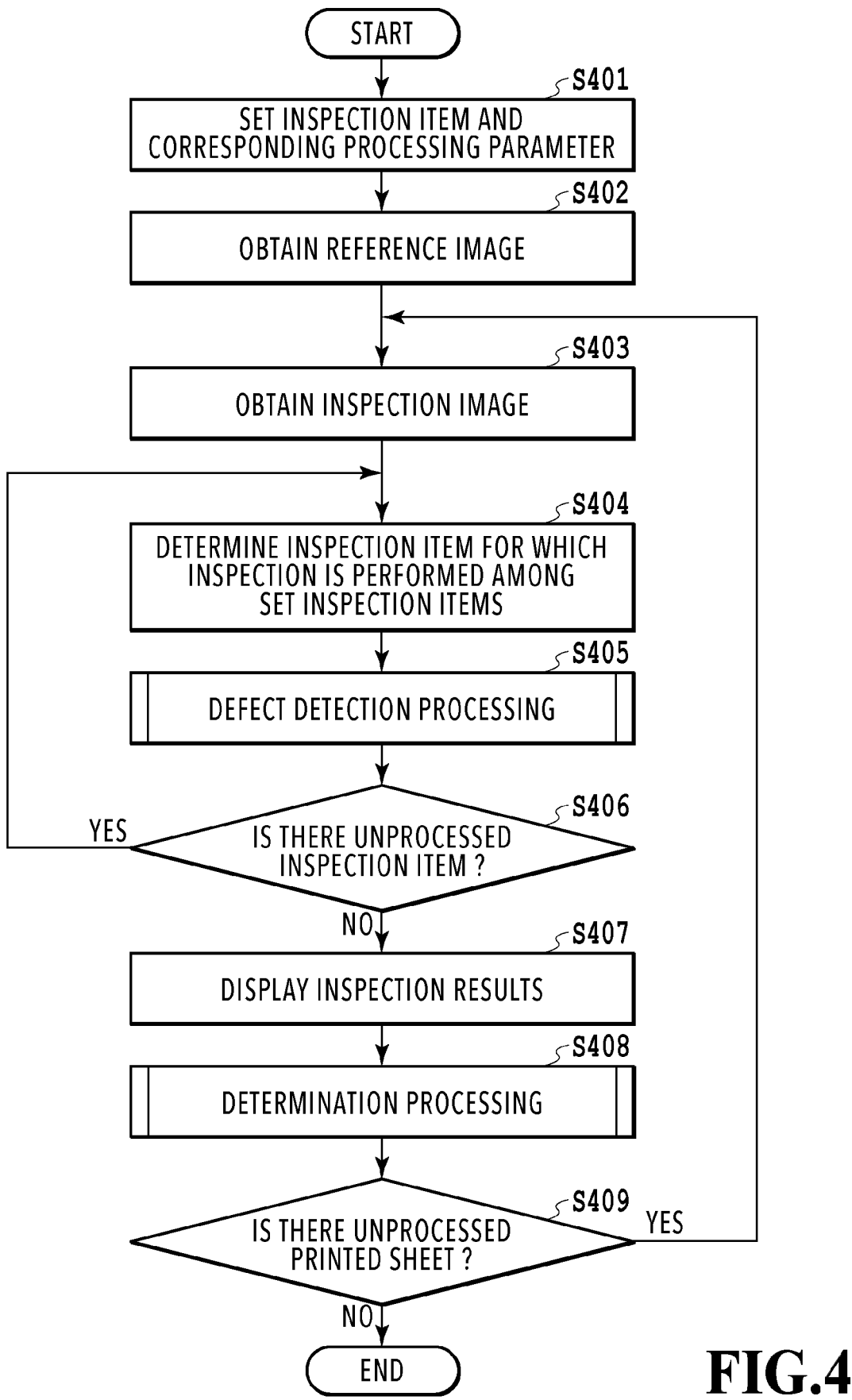
FIG. 4 is a flowchart showing a flow of inspection processing.

Next, the procedure of inspection processing that is performed by the inspection apparatus 100 according to the present embodiment is explained. FIG. 4 is a flowchart showing a flow of the inspection processing and S401 is performed for each print job and S402 and subsequent steps are performed for each page (for each sheet). In the following, explanation is given by taking a case as an example where a print job for printing a large number of documents each including one page is input. The series of processing shown by the flowchart in FIG. 4 is implemented by, for example, the CPU 101 reading a program stored in the ROM 103 onto the RAM 102 and executing the program. In the following explanation, symbol "S" means a step.

Figure 5A:
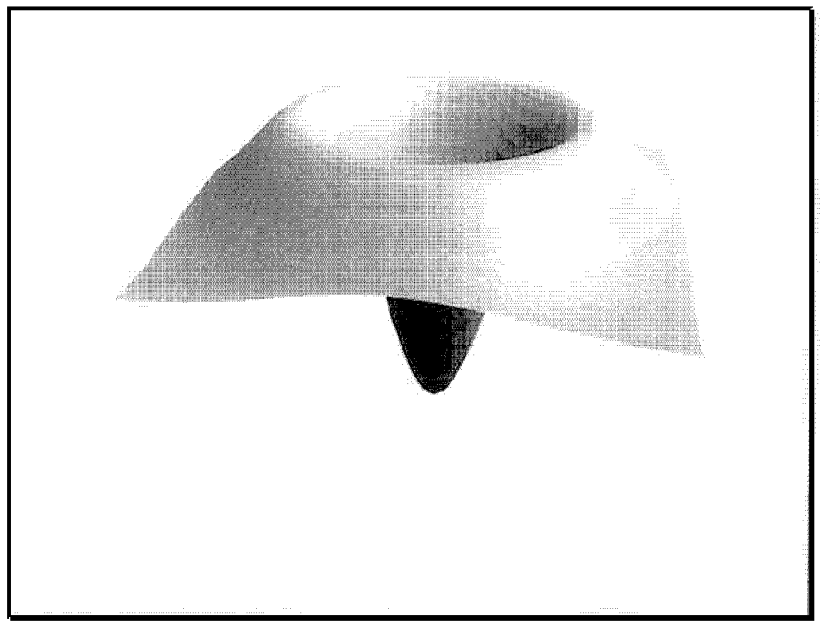
FIG. 5A and FIG. 5B are each a diagram showing a characteristic of a filter.
Figure 5B:
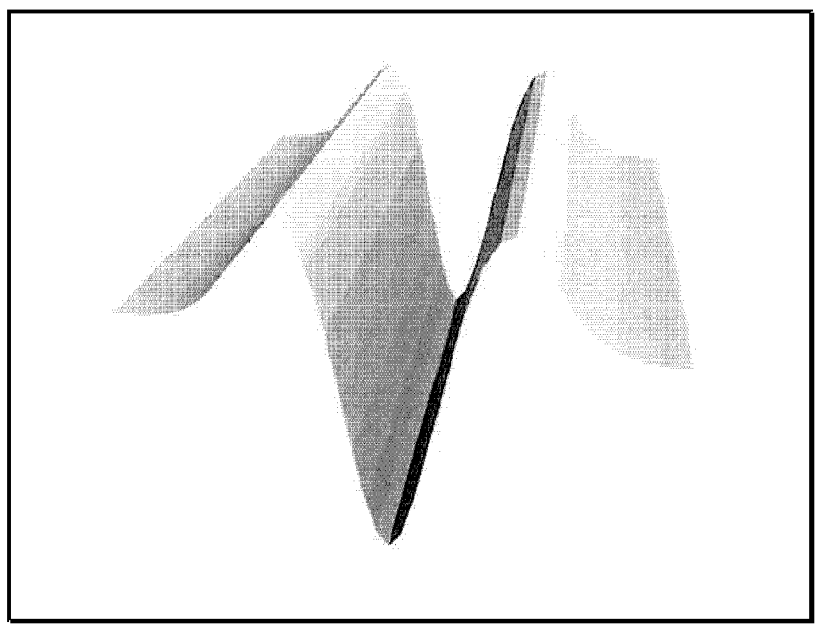

At S401, the inspection item setting unit 202 and the parameter setting unit 203 set the inspection item for which inspection is performed and the processing parameter corresponding thereto, respectively, based on the user input and the like via a UI screen, not shown schematically. As the kind of inspection item, there is a point-like defect (spot), a linear defect (streak), a color defect in which a destination color is not reproduced, image unevenness and the like. In a case where a user does not select any inspection item, it may also be possible for the inspection item setting unit 202 to set the inspection item that is specified as a default. The parameter setting unit 203 sets, for example, the kind and size of a filter that is used in filter processing, a threshold value that is used in binarization processing, and the like as the processing parameter corresponding to the inspection item selected or the like by a user. FIG. 5A shows the characteristic of a filter for highlighting a point-like defect and FIG. 5B shows the characteristic of a filter for highlighting a linear defect, respectively. For example, in a case where the inspection item is a point-like defect, by reducing the size of the filter in FIG. 5A, the point-like defect of a smaller size is highlighted and becomes more likely to be detected. Further, by reducing the threshold value for binarization processing, even a smaller difference value (contrast value) or a smaller color difference value exceeds the threshold value, and therefore, the difference value or the color difference value becomes more likely to be detected as a defect. As described above, the size of the filter, the threshold value at the time of binarization processing, and the like are set as the processing parameter.

Next, at S402, the image obtaining unit 201 obtains the data of the reference image obtained by scanning or the like a sample sheet and registered in advance from the RAM 102 or the main storage device 104. At S403 that follows, the image obtaining unit 201 obtains the data of the inspection image obtained by reading the printed sheet that is conveyed from the printing apparatus 190 from the RAM 102. The configuration may be one in which the image obtaining unit 201 obtains the data of the inspection image read by the image reading device 105 in advance and stored in the main storage device 104.

Next, at S404, the detection processing unit 204 determines the inspection item for which inspection is performed from the inspection items that are set at S401. In a case where no priority is given to the inspection item as to the execution order, it may be possible for the detection processing unit 204 to perform inspection in an arbitrary order, such as an order of selection. At S405 that follows, the detection processing unit 204 performs defect detection processing for the determined inspection item. Details of the defect detection processing will be described later. Then, at S406, whether or not the defect detection processing is completed for all the inspection items that are set at S401 is determined. In a case where the defect detection processing is completed for all the inspection items, the processing advances to S407. On the other hand, in a case where the defect detection processing is not completed for all the inspection items, the processing returns to S404, and the next execution-target inspection item is determined and the defect detection processing is continued.

Figure 6A:
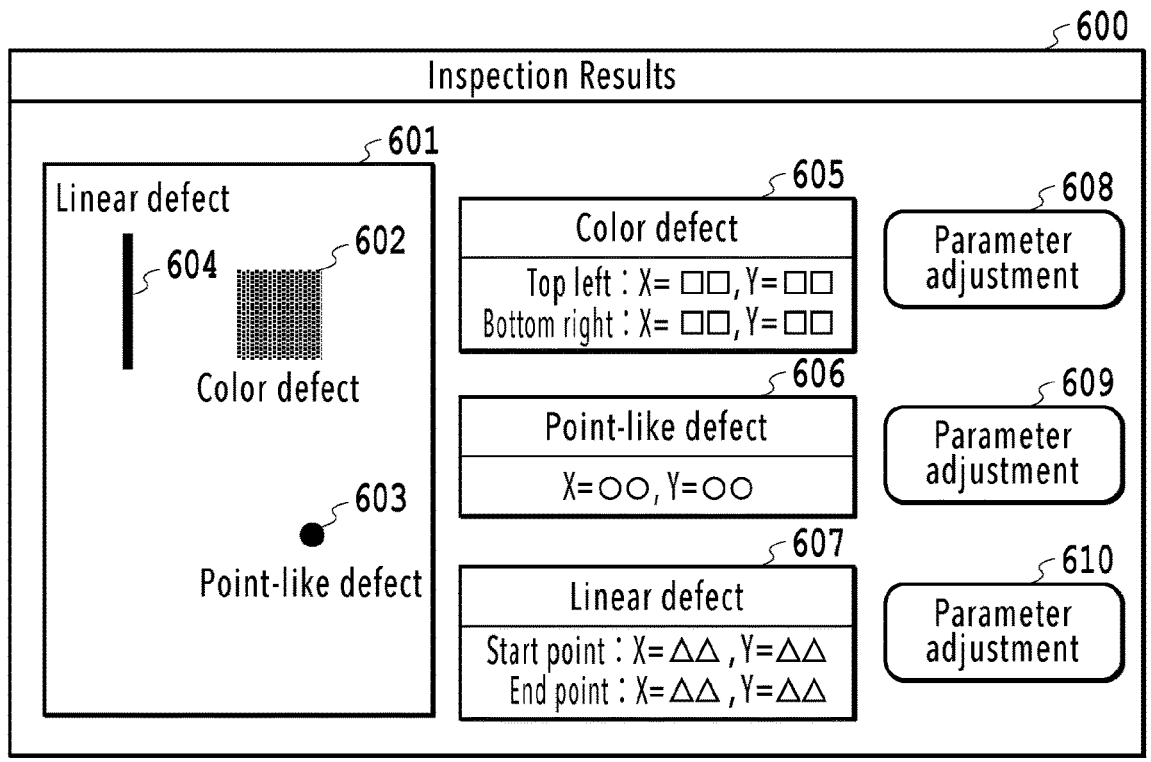
FIG. 6A and FIG. 6B are each a diagram showing an example of a UI screen showing inspection results.
Figure 6B:
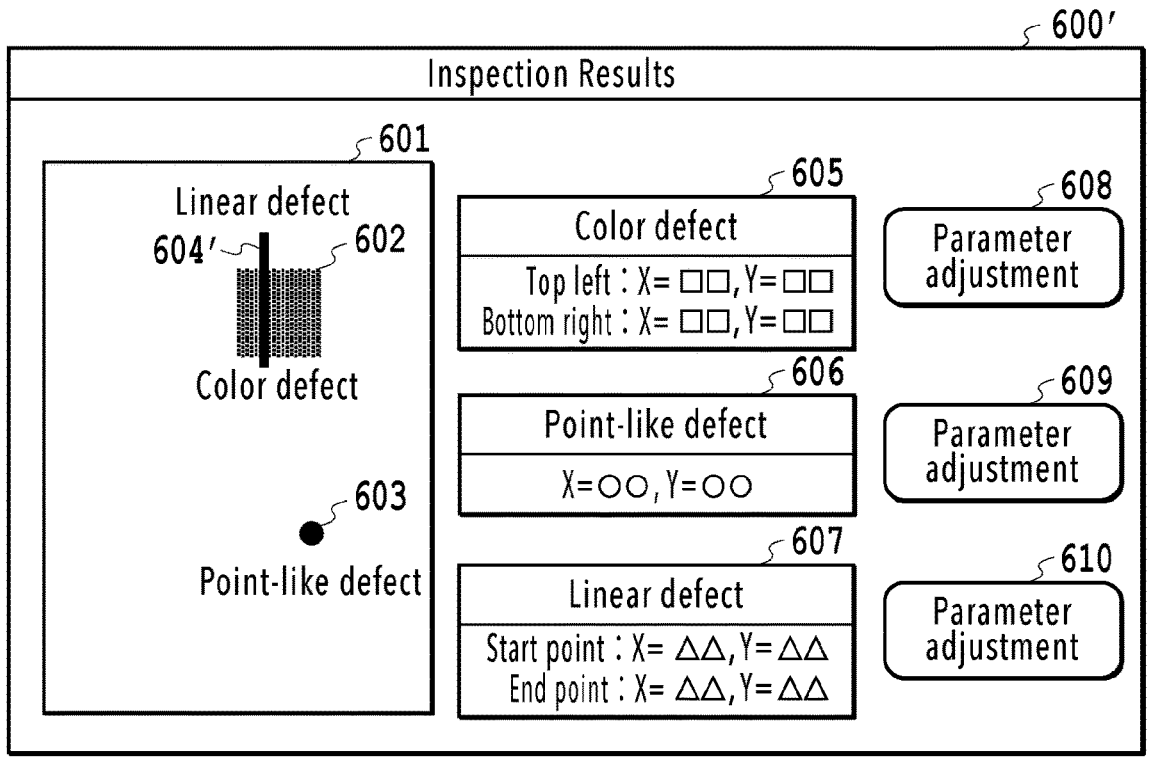

At S407, the results output unit 206 generates a UI screen showing the results of all the inspection items that are set at S401 and displays the UI screen on the UI panel 108. The destination of the display of the results may be any one and for example, it may also be possible to display the results on the display of an external device, such as a PC, which is connected so as to be capable of communication via a network. FIG. 6A and FIG. 6B are each an example of the UI screen showing the inspection results. In an image display area 601 on a UI screen 600 shown in FIG. 6A, three kinds of defects 602 to 604 detected from the inspection image are displayed along with each character string of "Color defect", "Point-like defect", and "Linear defect", indicating the corresponding inspection item. Further, coordinate information 605 to 607 indicating the position of the three kinds of the defects 602 to 604 within the inspection image are displayed together. A UI screen 600' shown in FIG. 6B is an example of a case where the color defect 602 and a linear defect 604' are detected in the overlapping state. Here, the example of a case is shown where the point-like defect, the linear defect, and the color defect are detected one each, but as a matter of course, there is a case where a plurality of defects is detected and in this case all the defects are displayed. Further, the UI screen 600 and the UI screen 600' each have buttons 608 to 610 for adjusting the processing parameter of each inspection item. For example, in a case where the button 609 corresponding to the "Point-like defect" is pressed down, it is possible to adjust the processing parameter at the time of detecting a point-like defect. In a case where these adjustment buttons are pressed down, the UI screen makes a transition into a UI screen for parameter adjustment (or a UI screen is displayed in a popup manner) and it may be possible to cause a user to adjust the processing parameter.

At next S408, the density correction instruction unit 205 performs processing to determine whether or not density correction processing is necessary based on the results of the defect detection processing, which correspond to all the inspection items that are set at S401. Then, in a case of determining that the density correction processing is necessary, the density correction instruction unit 205 instructs the printing apparatus 190 to perform the density correction processing. Details of the determination processing at S408 will be described later.

Then, at S409, whether or not the inspection is completed for all the printed sheets relating to the input print job is determined. In a case where the inspection is completed for all the printed sheets relating to the print job, this processing is terminated. On the other hand, in a case where there is an unprocessed printed sheet, the processing returns to S403, and the next inspection image is obtained and the processing is continued.

The above is a rough flow of the inspection processing. In the present embodiment, explanation is given by taking the case as an example where the large number of documents each including only one page is printed, but it is also possible to apply the present embodiment to, for example, a case where a large number of documents each including a plurality of pages is printed. In this case, it is sufficient to return the processing to S402 as needed and obtain the reference image corresponding to the inspection image.

<Defect Detection Processing>

Figure 7:
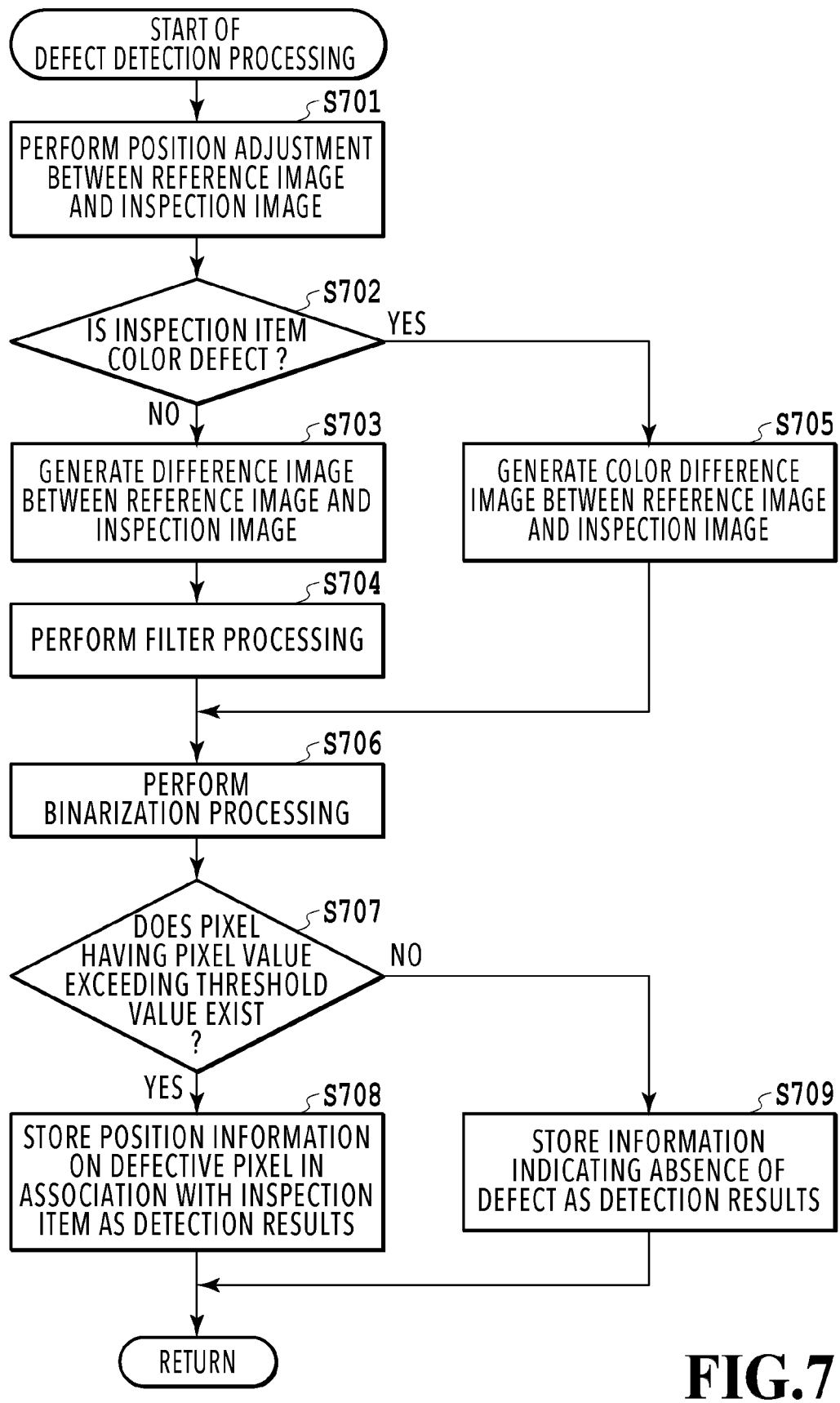
FIG. 7 is a flowchart showing details of defect detection processing according to a first embodiment.

Next, with reference to the flowchart in FIG. 7, details of the defect detection processing that is performed by the detection processing unit 204 at S405 are explained.

First, at S701, by using a general position adjustment method, the position adjustment between the reference image and the inspection image is performed. As a general position adjustment method, for example, there is a method in which feature points are extracted and projection transformation or affine transformation is performed so that the sum total of the Euclid distances of the extracted feature points is minimum. Following the above, at S702, the processing is branched in accordance with whether the execution-target inspection item is a color defect. In a case where the inspection item other than the color defect is the execution target, the processing advances to S703 and in a case where the color defect is the execution target, the processing advances to S705.

At S703 in a case where the defect other than the color defect is inspected, an image (in the following, called "difference image") showing a difference between the reference image and the inspection image is generated. Here, it is possible to obtain the difference image by, after converting the reference image and the inspection image, in which each pixel has density values of three channels of RGB, into images having one channel, comparing the pixel values for each of corresponding pixels and obtaining the difference value for each pixel. At S704 that follows, the filter processing for highlighting a specific defect shape is performed for the difference image generated at S703.

At S705 in a case where the color defect is inspected, an image (in the following, called "color difference image") showing a color difference between the reference image and the inspection image is generated. Here, it is possible to obtain the color difference image by converting the reference image and the inspection image, in which the color of each pixel is represented in the RGB color space, into images in which the color of each pixel is represented in the L*a*b* color space and obtaining a color difference $\Delta E76$ for each pixel, which is the Euclid distance in the L*a*b* color space. It is possible to find the color difference $\Delta F76$ by formula (1) below in a case where, for example, pixel values in the L*a*b* color space of the reference image are taken to be $(L^*_1, a^*_1, b^*_1)$ and those of the inspection image are taken to be $(L^*_2, a^*_2, b^*_2)$.

$$\Delta E76 = \sqrt{((L^*_2 - L^*_1)^2 + (a^*_2 - a^*_1)^2 + (b^*_2 - b^*_1)^2)} \qquad \text{formula (1)}$$

Normally, it is said that the level in a case where the value of ΔE, which is found by formula (1) described above, is about "2 to 3" is a level at which a difference between two colors is recognized by visually comparing the two colors being separated from each other. Here, the color difference is evaluated by using ΔF76, but it is needless to say that the index for evaluating the color difference is not limited to this.

At next S706, the binarization processing is performed for the difference image for which the filter processing has been performed at S704 or the color difference image generated at S705. Specifically, processing to attach a value "1" indicating that there is a defect in a case where each pixel value (difference value or color difference value) is larger than or equal to a threshold value and attach a value "0" indicating that there is no defect in a case where each pixel value is less than the threshold value is performed for each pixel and a binary image in which each pixel has a value of "1" or "0" is generated.

Following the above, at S707, whether or not a pixel having the pixel value "1" exists among the pixels constituting the binary image generated by the binarization processing is determined. In a case where the determination results indicate that such a pixel exists, the processing advances to S708 and in a case where such a pixel does not exist, the processing advances to S709.

At S708, information (specifically, information associating the kind of inspection item and the coordinates of the position at which a defect is detected) indicating that a defect is detected is stored in the RAM 102 as information on the detection results. In a case where the information relating to the detected defect is stored, this processing is terminated and the processing returns to the flow in FIG. 4. Further, at S709, it is determined that a defect corresponding to the inspection item does not exit within the inspection image and information indicating that there is no defect is stored in the RAM 102 as information on the detection results and after that, the processing returns to the flow in FIG. 4.

The above is the contents of the defect detection processing according to the present embodiment.

<Determination Processing>

Figure 8:
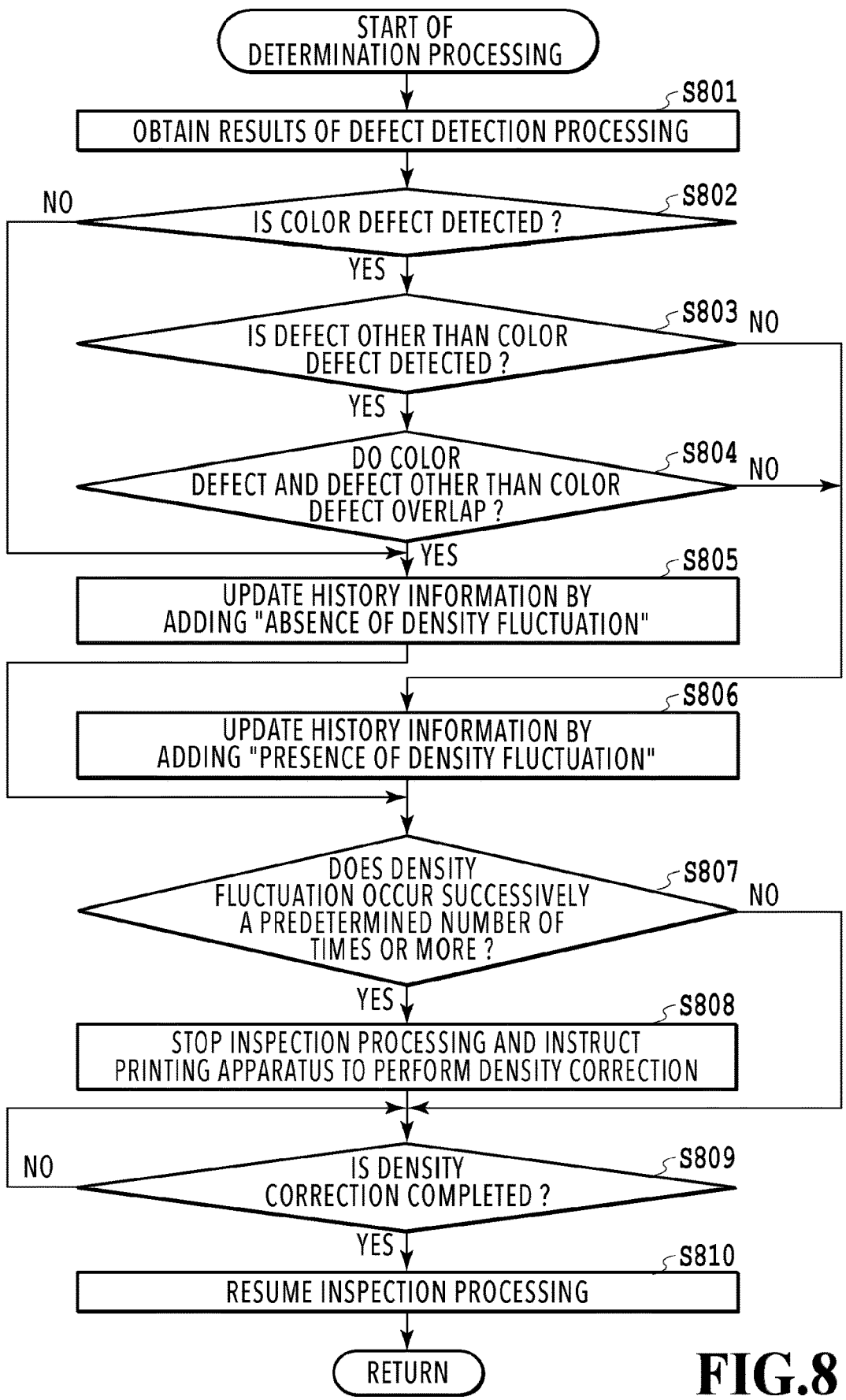
FIG. 8 is a flowchart showing details of determination processing according to the first embodiment.

Next, with reference to the flowchart in FIG. 8, details of the determination processing that is performed by the density correction instruction unit 205 at S408 are explained.

At S801, the information on the detection results stored at S708 or S709 of the defect detection processing described previously is read from the RAM 102. Then, at S802 to S804, based on the read information on the detection results, the processing is branched. First, at S802, whether information indicating that a color defect is detected is included in the obtained information on the detection results is determined and in a case where the former information is included in the latter information, the processing advances to S803 and in a case where the former information is not included in the latter information, the processing advances to S805. Then, at S803 in a case where the information indicating that a color defect is detected is included, whether information indicating that a defect other than the color defect is detected is further included in the obtained information on the detection results is determined. Then, in a case where the former information is included in the latter information, the processing advances to S804 and in a case where the former information is not included in the latter information (in a case where any defect is not detected), the processing advances to S806. Then, at S804 in a case where both the color defect and the defect other than the color defect are detected, on a condition that the color defect and the defect other than the color defect overlap, the processing advances to S805 and on a condition that they do not overlap, the processing advances to S806. In the present embodiment, the defect other than the color defect is the point-like defect or the linear defect. For the determination of whether the color defect and the defect other than the color defect overlap, for example, the coordinate information indicating the position of each defect is used. Alternatively, it may also be possible to attach in advance a flag to the pixel determined to be a defective pixel in the defect detection processing, the flag indicating this fact, and in a case where the flag is set to both the color defect and the defect other than the color defect for the pixels at the same position, determine that both the defects overlap.

At S805, it is determined that the density fluctuation has not occurred in the printing apparatus 190 and updating processing of the history information is performed, which adds a value indicating "absence of density fluctuation" to the history information that accumulates the results of the density fluctuation determination. Here, the reason it is determined that the density fluctuation has not occurred is that it is possible to regard the color defect in a case where another defect overlaps the color defect as being affected by the other defect. Further, at S806, it is determined that the density fluctuation has occurred in the printing apparatus 190 and the updating processing of the history information is performed, which adds a value indicating "presence of density fluctuation" to the history information described above. FIG. 9A and FIG. 9B are diagrams explaining the way the table as the above-described history information is updated. FIG. 9A is the table before the updating and FIG. 9B is the table after the updating. In the updating processing, processing to insert a new results value of the density fluctuation determination into the row of "No. 1" and at the same time, sequentially send each results value before the updating to the following row below, and delete the results value stored in the row of "No. 20" before the updating is performed. In the tables in FIG. 9A and FIG. 9B, the determination results of 20 pages are accumulated, but the number of pages stored as the history information may be any number and the number of pages is not limited to 20. It is only required that there be an amount of information sufficient for determining whether or not it is necessary to cause the printing apparatus 190 to perform the density correction processing.

At S807, by referring to the history information on the density fluctuation determination, for which the updating processing has been performed at S805 or S806, whether or not "presence of density fluctuation" is recorded successively a predetermined number of times or more from "No. 1" is determined. In a case where the determination results indicate that "presence of density fluctuation" is recorded successively a predetermined number of times or more, the processing advances to S808 and in other cases, the processing skips S808 and advances to S809. Here, in a case where the predetermined number of times is set to three, the processing advances to S808 at the time of the state of the table in FIG. 9A becoming the state of the table in FIG. 9B. On the other hand, in a case where the value of "No. 1" in the updated table is "presence of density fluctuation" but is not recorded successively a predetermined number of times or more, or in a case where the value of "No. 1" is "absence of density fluctuation", the processing advances to S809.

At S808, first, the execution of the inspection processing in the inspection apparatus 100 is stopped. Then, via the printing apparatus I/F 106 and the inspection apparatus I/F 196, the printing apparatus 190 is instructed to perform the density correction processing. The printing apparatus 190 having received the instructions immediately stops the execution of the input print job and performs the density correction processing. Specifically, first, the printing apparatus 190 outputs a specified chart image by the print unit 194. Next, the printing apparatus 190 reads the output results by the scanner unit 193 and obtains the density characteristic of the print unit 194. Then, the printing apparatus 190 modifies the output density value of the correction LUT that is used in the gamma correction processing so that a desired density characteristic is obtained. The printing apparatus 190 having completed the density correction processing notifies the inspection apparatus 100 of that and at the same time, resumes the execution of the print job, which has been in abeyance.

At S809, processing to check whether or not the notification to the effect that the density correction processing is completed is received from the printing apparatus 190 is performed. In a case where the notification to the effect that the density correction processing is completed is received, the processing advances to S810. Then, at S810, the inspection processing is resumed. After the resumption, the processing returns to the flow in FIG. 4.

The above is the contents of the determination processing. Due to this, it is made possible to cause the printing apparatus 190 to perform the density correction processing only in the case where the color defect that can be expected to be improved by the density correction processing occurs successively at the portions at which the color defect does not overlap another defect. In the present embodiment, the output results of the chart image are read by the scanner unit 193 of the printing apparatus 190 and the correction LUT is modified, but the present embodiment is not limited to this. For example, it may also be possible to modify the correction LUT by providing a density sensor, a spectroscopic sensor, an RGB sensor and the like in the vicinity of the conveyance path 192 of the printing apparatus 190 and using the measured values thereof. Alternatively, it may also be possible to modify the correction LUT by reading the output results of the chart image by the image reading device 105 of the inspection apparatus 100.

<Modification Example>

Next, an aspect is explained as a modification example in which the state where the density fluctuation whose level is less than that of the "color defect" occurs is detected and then the printing apparatus 190 is caused to perform the density correction processing preventively before the "color defect" occurs. The flow of the inspection processing shown in the flow in FIG. 4 is the same, and therefore, explanation thereof is omitted and in the following, differences from the above-described embodiment are explained mainly.

<<Defect Detection Processing>>

Figure 10:
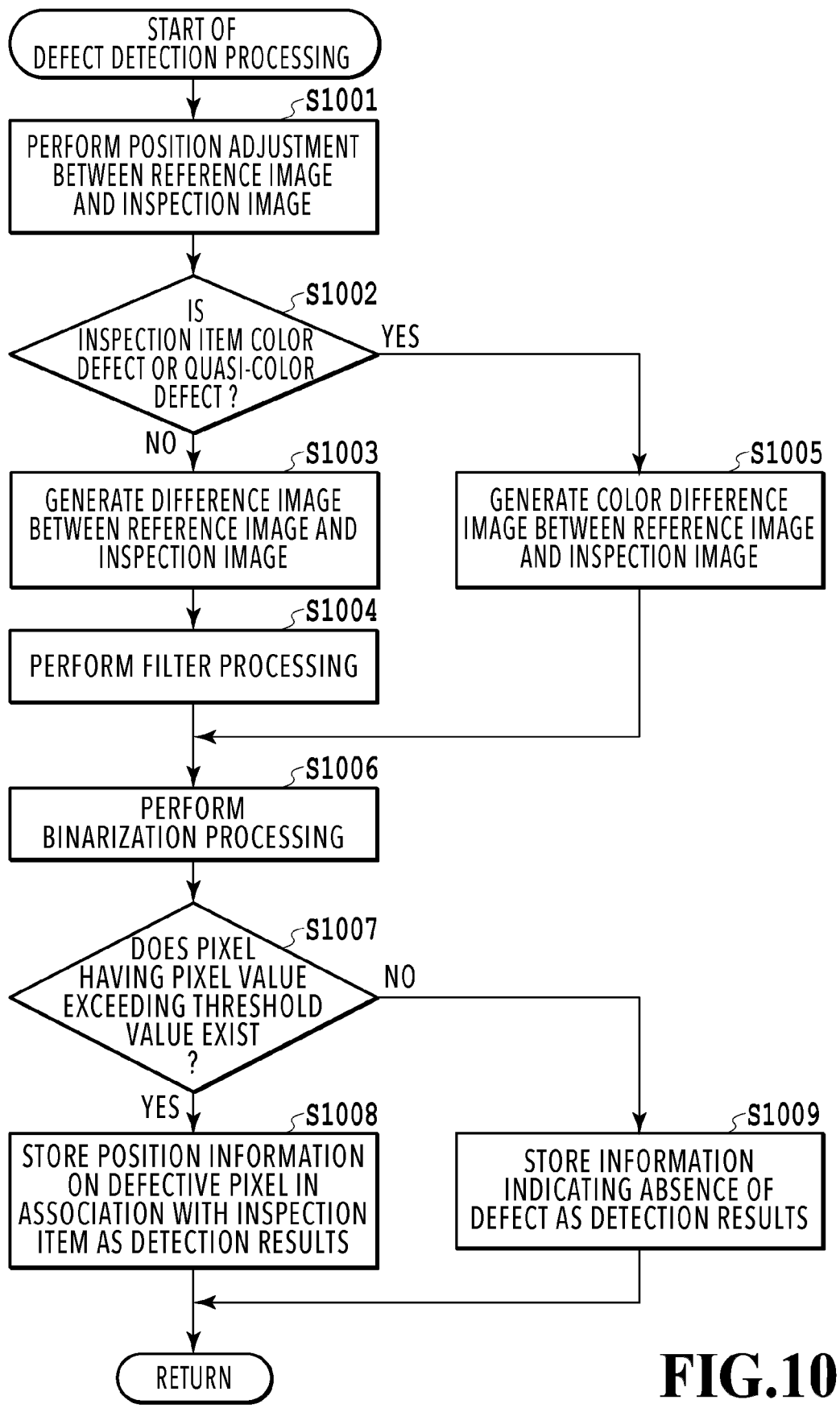
FIG. 10 is a flowchart showing details of defect detection processing according to a modification example.

FIG. 10 is a flowchart showing details of the defect detection processing according to the present modification example. Here, it is assumed that the state where the density fluctuation at a predetermined level less than the inspection level of the "color defect" relating to user selection has occurred is called a "quasi-color defect". Further, it is sufficient to set the detection of the "quasi-color defect" so that the detection is performed automatically and incidentally, for example, in a case where the "color defect" is set as the inspection item. Alternatively, it may also be possible to enable a user to select whether or not to perform the detection of the "quasi-color defect" via a UI screen, not shown schematically. In the following, points different from those of the flow in FIG. 7 of the first embodiment are explained mainly.

First, at S1001, as at S701, by using a general position adjustment method, the position adjustment between the reference image and the inspection image is performed. Following S1001, at S1002, the processing is branched in accordance with whether the execution-target inspection item is the color defect or the quasi-color defect. In a case where the inspection item other than the color defect or the quasi-color defect is the execution target, the processing advances to S1003 and in a case where the color defect or the quasi-color defect is the execution target, the processing advances to S1005.

At S1003, as at S703, a difference image showing the difference between the reference image and the inspection image is generated, At S1004 that follows, the filter processing for highlighting a specific defect shape is performed for the difference image generated at S1003. Further, at S1005, as at S705, a color difference image showing the color difference between the reference image and the inspection image is generated.

At next S1006, the binarization processing is performed for the difference image for which the filter processing has been performed at S1004 or the color difference image generated at S1005. At this time, as the threshold value that is used in a case where the execution-target inspection item is the quasi-color defect, a value obtained by multiplying the threshold value that is used for the color defect by a ratio less than 100% determined in advance is used. For example, in a case where the threshold value that is used in the binarization processing for detecting the color defect is $\Delta E76=6$ and the ratio less than 100% determined in advance is 50%, the threshold value that is used in the binarization processing for detecting the quasi-color defect is $\Delta F76=3$.

The subsequent processing is the same as that in the flow in FIG. 7 described previously. That is, whether or not a pixel having the pixel value "1" exists among the pixels constituting the binary image generated by the binarization processing is determined (S1007) and in a case where such a pixel exists, the processing advances to S1008 and in a case where such a pixel does not exist, the processing advances to S1009. Then, at S1008, information indicating that a defect is detected is stored in the RAM 102 as information on the detection results and this processing is terminated. Further, at S1009, it is determined that a defect corresponding to the inspection item does not exit within the inspection image and information indicating that there is no defect is stored in the RAM 102 as information on the detection results and this processing is terminated.

The above is the contents of the defect detection processing according to the present modification example. After the defect detection processing is completed for all the set inspection items, the processing advances to the display processing of the detection results (NO at S406 and then S407), but it is not necessary to display the results of detection/undetection of the quasi-color defect.

<<Determination Processing>>

Figure 11:
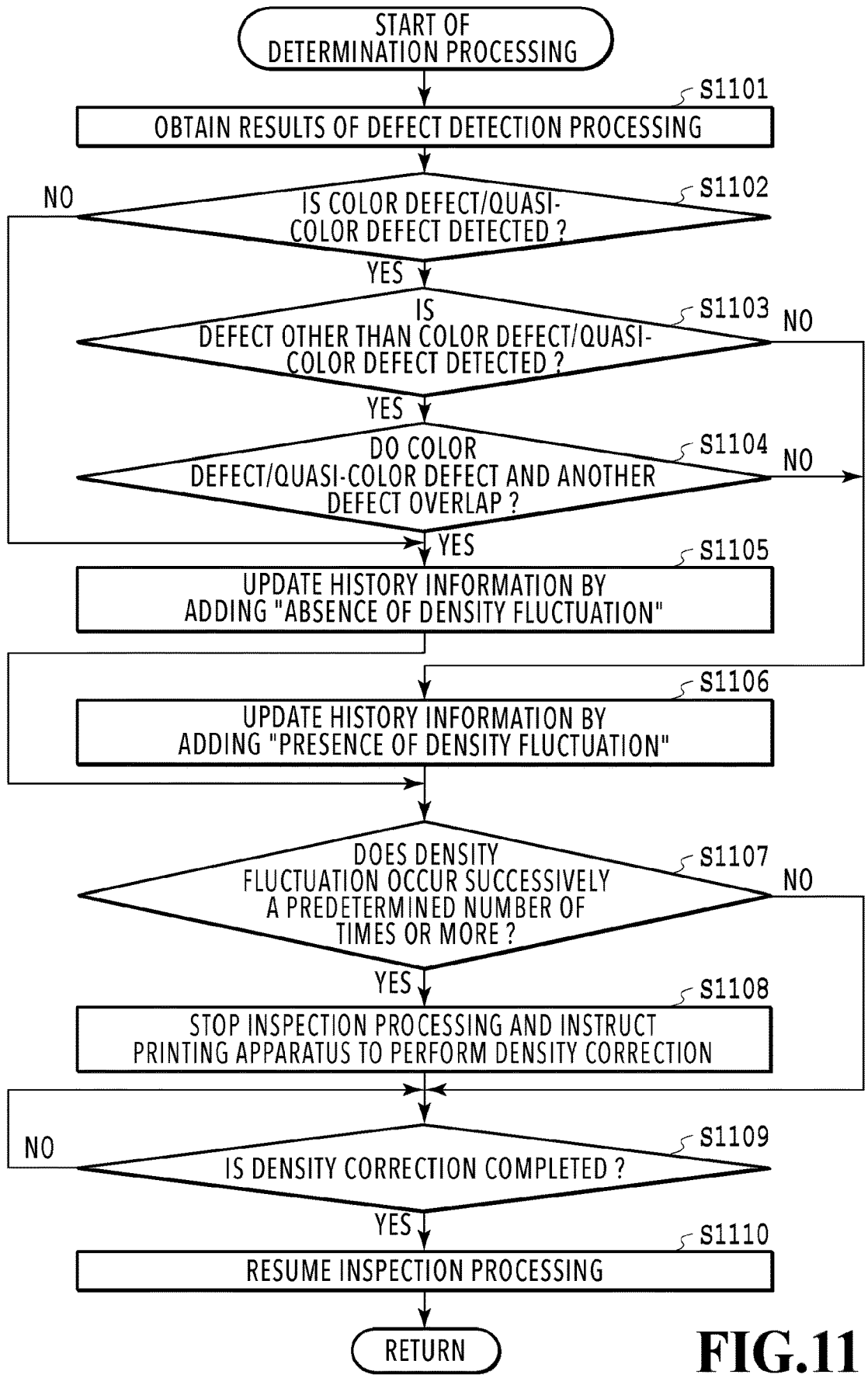
FIG. 11 is a flowchart showing details of determination processing according to the modification example.

FIG. 11 is a flowchart showing details of the determination processing according to the present modification example. In the following, points different from those in the flow in FIG. 8 of the first embodiment are explained mainly.

At S1101, as at S801, the information on the detection results stored at S1008 or S1009 of the defect detection processing described previously is read from the RAM 102. Then, at S1102 to S1104, based on the read information on the detection results, the processing is branched. First, at S1102, in a case where information indicating that a color defect or a quasi-color defect is detected is included in the obtained information on the detection results, the processing advances to S1103 and in other cases, the processing advances to S1105. Then, at S1103 in a case where the color defect or the quasi-color defect is detected, in a case where the information indicating that a defect other than the color defect or the quasi-color defect is detected is further included in the obtained information on the detection results, the processing advances to S1104 and in other cases (in a case where any defect is not detected), the processing advances to S1106. Then, at S1104, in a case where the defect or the quasi-color defect and the defect other than those are both detected, on a condition that the color defect or the quasi-color defect and the defect other than those overlap, the processing advances to S1105 and in a case where they do not overlap, the processing advances to S1106.

At S1105, it is determined that the density fluctuation has not occurred in the printing apparatus 190 and updating processing to add a value indicating "absence of density fluctuation" to the history information that accumulates the results of the density fluctuation determination is performed.

The subsequent processing is the same as that in the flow in FIG. 8 described previously. That is, at S1105, it is determined that the density fluctuation has not occurred in the printing apparatus 190 and updating processing to add a value indicating "absence of density fluctuation" to the history information described above is performed. Further, at S1106, it is determined that the density fluctuation has occurred in the printing apparatus 190 and the updating processing to add a value indicating "presence of density fluctuation" to the history information described above is performed. Then, at S1107, by referring to the history information on the density fluctuation determination, for which the updating processing has been performed at S1105 or S1106, whether or not "presence of density fluctuation" continues a predetermined number of times or more from "No. 1" is determined. In a case where the determination results indicate that "presence of density fluctuation" continues a predetermined number of times or more, the processing advances to S1108 and the execution of the inspection processing is stopped and the printing apparatus 190 is instructed to perform the density correction processing. Then, in a case where a notification to the effect that the density correction processing is completed is received from the printing apparatus 190 (YES at S1109), the inspection processing is resumed (S1110).

The above is the contents of the determination processing according to the present modification example.

By the processing as described above, it is made possible to detect the "quasi-color defect" in which the density fluctuation whose level is less than that of the "color defect" occurs and cause the printing apparatus 190 to perform the density correction processing preventively before the "color defect" occurs.

As above, according to the present embodiment, it is possible to perform the density correction processing at appropriate timing that takes into consideration the density fluctuation of the printing apparatus and it is made possible to appropriately suppress the color defect while suppressing execution of unnecessary density correction processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to perform the density correction processing at appropriate timing that takes into consideration the state of the printing apparatus. Due to this, it is made possible to perform both quality maintenance of a printed material and suppression of a reduction in productivity of the printing apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-080158, filed May 11, 2021 which is hereby incorporated by reference wherein in its entirety.

What is claimed is:

1. An information processing apparatus that performs an inspection of a printed material, the apparatus comprising:

one or more controllers including one or more processors and one or more memories, the one or more controllers being configured to:

obtain a read image obtained by reading a printed sheet that is output from a printing apparatus and a reference image that is used as a reference in an inspection for the read image;

detect a print defect based on a difference between the obtained read image and the reference image; and give instructions to perform density correction processing to the printing apparatus based on results of the detection for a plurality of the printed sheets, wherein in a case where a color defect in which a destination color is not reproduced among detected print defects occurs successively at positions at which the color defect does not overlap another defect other than the color defect, the printing apparatus is given the instructions to perform the density correction processing.

2. The information processing apparatus according to claim 1, wherein
the one or more controllers are further configured to:
create history information recording the presence/absence of a density fluctuation in the printing apparatus for each of the printed sheets; and
give the instructions in a case where presence of density fluctuation is recorded successively a predetermined number of times or more by the history information.

3. The information processing apparatus according to claim 2, wherein
in a case where the color defect and the other defect are detected,
the one or more controllers are further configured to:
record presence of density fluctuation in the history information in a case where the color defect occurs at a position at which the color defect does not overlap the other defect; and
record absence of density fluctuation in the history information in a case where the color defect occurs at a position at which the color defect overlaps the other defect.

4. The information processing apparatus according to claim 3, wherein
the other defect is a point-like defect or a linear defect.

5. The information processing apparatus according to claim 1, wherein
the one or more controllers are further configured to:
generate a difference image indicating a difference between the read image and the reference image; and
detect the print defect from the image indicating the difference for each pixel.

6. The information processing apparatus according to claim 5, wherein
the color of each pixel of the read image and the reference image is represented in an RGB color space and
the one or more controllers are further configured to:
detect the color defect by using a first difference image obtained by converting the color of each pixel represented in the RGB color space into an L*a*b* color space and evaluating the color difference for each pixel based on a Euclid distance in the L*a*b* color space; and
detect the other defect by using a second difference image obtained by converting the color of each pixel represented in three channels of RGB into that represented in one channel, comparing pixel values for each of corresponding pixels, and obtaining the difference value for each pixel.

7. The information processing apparatus according to claim 5, wherein
the one or more controllers are further configured to detect the color defect and the other defect by performing binarization processing using a threshold value for the difference image.

8. The information processing apparatus according to claim 7, wherein
the binarization processing is processing to attach a value indicating the presence of defect in a case where each pixel value in the difference image is larger than or equal to the threshold value and attach a value indicating the absence of defect in a case where each pixel value is less than the threshold value.

9. The information processing apparatus according to claim 7, wherein
the one or more controllers are further configured to:
set a kind of print defect to be detected;
further detect a quasi-color defect in a state where a density fluctuation whose predetermined level is less than that of the color defect occurs in a case where the color defect is set; and
give instructions to perform the density correction processing to the printing apparatus in a case where the quasi-color defect occurs successively at positions at which the quasi-color defect does not overlap the other defect.

10. The information processing apparatus according to claim 9, wherein
the one or more controllers are further configured to detect the quasi-color defect by performing the binarization processing using a value obtained by multiplying the threshold value used in the binarization processing for detecting the color defect by a ratio less than 100% determined in advance as a threshold value corresponding to the predetermined level.

11. The information processing apparatus according to claim 9, wherein
the one or more controllers are further configured to:
display a UI screen including information associating the kind and the occurrence position of the detected print defect; and
not display the quasi-color defect.

12. A printing system having a printing apparatus and an information processing apparatus that inspects a printed material,
the inspection apparatus comprising:
one or more controllers including one or more processors and one or more memories, the one or more controllers being configured to:
obtain a read image obtained by reading a printed sheet that is output from the printing apparatus and a reference image that is used as a reference in an inspection for the read image;
detect a print defect based on a difference between the obtained read image and the reference image; and
give instructions to perform density correction processing to the printing apparatus based on results of the detection for a plurality of the printed sheets in a case where a color defect in which a destination color is not reproduced among detected print defects occurs successively at positions at which the color defect does not overlap another defect other than the color defect, and
the printing apparatus performs the density correction processing in accordance with the instructions.

13. A control method of a printing system having a printing apparatus and an information processing apparatus that inspects a printed material, the control method comprising the steps of:
in the inspection apparatus:
obtaining a read image obtained by reading a printed sheet that is output from the printing apparatus and a reference image that is used as a reference in an inspection for the read image;
detecting a print defect based on a difference between the obtained read image and the reference image; and
giving instructions to perform density correction processing to the printing apparatus in a case where a color defect in which a destination color is not reproduced among detected print defects of a plurality of the printed sheets occurs successively at positions at which the color defect does not overlap another defect other than the color defect and in the printing apparatus:

performing the density correction processing in accordance with the instructions from the inspection apparatus.

14. A non-transitory computer readable storage medium storing a program for causing a computer to perform a control method of a printing system having a printing apparatus and an information processing apparatus that inspects a printed material, the control method comprising the steps of:

in the inspection apparatus:

obtaining a read image obtained by reading a printed sheet that is output from the printing apparatus and a reference image that is used as a reference in an inspection for the read image;

detecting a print defect based on a difference between the obtained read image and the reference image; and giving instructions to perform density correction processing to the printing apparatus in a case where a color defect in which a destination color is not reproduced among detected print defects of a plurality of the printed sheets occurs successively at positions at which the color defect does not overlap another defect other than the color defect and in the printing apparatus:

performing the density correction processing in accordance with the instructions from the inspection apparatus.

* * * * *